United States Patent [19]

Anderson et al.

[11] 4,090,555

[45] May 23, 1978

[54] HEAT PIPE ASSEMBLY

[75] Inventors: John H. Anderson; Elmer D. Waters, both of Richland, Wash.

[73] Assignee: McDonnell Douglas Corporation, Long Beach, Calif.

[21] Appl. No.: 787,914

[22] Filed: Apr. 15, 1977

Related U.S. Application Data

[60] Division of Ser. No. 462,916, Apr. 22, 1974, Pat. No. 4,036,286, which is a continuation-in-part of Ser. No. 303,221, Nov. 2, 1972, Pat. No. 3,823,769.

[51] Int. Cl.² .......................................... F28D 15/00
[52] U.S. Cl. ............................... 165/76; 29/157.3 R; 29/157.3 A; 165/105
[58] Field of Search ................. 165/76, 105, 96, 185, 165/181; 29/157.3 A, 157.3 R

[56] References Cited

U.S. PATENT DOCUMENTS

| 280,540 | 7/1883 | Weatherly | 165/96 |
|---|---|---|---|
| 3,572,426 | 3/1971 | Edwards | 165/105 X |
| 3,739,234 | 6/1973 | Bylund et al. | 165/105 X |
| 3,884,293 | 5/1975 | Pessolano et al. | 165/105 X |

FOREIGN PATENT DOCUMENTS

| 22,579 of | 1900 | United Kingdom | 165/105 |

Primary Examiner—Albert W. Davis, Jr.

Attorney, Agent, or Firm—Henry G. Kohlmann; Walter J. Jason; Donald L. Royer

[57] ABSTRACT

A separable heat pipe assembly for stabilizing the generally frozen soil adjacent and supporting a structural member or foundation in permafrost or similar regions, including a cooperative combination of a tubular structure installed in a permafrost environment, a heat pipe element having its lower portion installed in the structure and positioned at least in proximity longitudinally to the wall of the structure, and soil or other substance filling the space remaining between the lower element portion and the structure wall. The upper portion of the heat pipe element has a thicker wall than its lower portion and can be provided with threads thereon. A sleeve-type radiator can be provided with complementary threads therein so that the radiator can be threadedly engaged to the upper element portion. The depth and pitch of the threads can be changed to vary the heat transfer surface area obtainable between the engaged radiator and upper element portion. Alternatively, the radiator and upper element portion are not threaded but can be sized to provide for an interference press fit to secure them together. A lubricant-preservative-thermal substance can be used to fill any interface space between the mating surfaces of the threadedly engaged or press-fitted radiator and upper element portion.

5 Claims, 12 Drawing Figures

HEAT PIPE ASSEMBLY

CROSS-REFERENCE TO RELATED APPLICATION

This is a division of application Ser. No. 462,916 filed 22 Apr. 1974, now U.S. Pat. No. 4,036,286, which is a continuation in part of application Ser. No. 303,221 filed Nov. 2, 1972, now U.S. Pat. No. 3,823,769.

BACKGROUND OF THE INVENTION

Our invention relates generally to support structures and, more particularly, to a novel and useful heat pipe assembly for use with support structures or foundations in permafrost areas or in any areas having active ground layers subject to a severe annual freeze-thaw cycle.

Permafrost is material which is largely frozen permanently. It is usually a mixture of soil, rock and ice although it can be anything from solid rock to muddy ice. In the arctic regions, permafrost may extend from a few feet to hundreds of feet below the surface. The permafrost is separated from the surface by an upper soil layer commonly called the tundra which supports a dense growth of surface vegetation. The tundra is subject to a seasonal freeze-thaw cycle and serves as insulation to limit permafrost thaw in the summer. The thaw in the summer, however, can create an unstable condition for structures constructed in the arctic regions. This is, of course, more so in wet, ice-rich, permafrost areas than in dry, stable, permafrost areas of well drained soil or rock.

There are severe problems associated with support and stabilization of structures in the arctic regions where permafrost is prevalent. Alaskan railroads, for example, require the expenditure of thousands dollars each year to repair soil slippages and track roughness resulting from the annual freeze-thaw cycle and disturbances of the ground cover by the intrusion of man and his machines. When the tundra is broken or removed, the permafrost loses its insulation and begins to melt and erode. Thus, tracks left by a tractor or caterpillar train can become a deep ditch and alter the surface drainage pattern over a wide area.

In cities and regions which overlay permafrost areas, a gravel insulating technique is generally used in construction over such areas. A raised gravel pad, for example, is ordinarily employed to provide a suitable support or work area on permafrost. Foundation structures embedded in permafrost are also commonly surrounded completely by a layer of insulating gravel. In areas of ice-rich permafrost and/or during a strong summer thaw, however, even the use of a relatively thick insulating gravel layer is inadequate to prevent some subsidence and possible accompanying damage of the supported structure or apparatus. On the other hand, instead of subsiding, support posts or poles for active overhead communications and power lines have presented a particular problem with "pole jacking" wherein the annual seasonal uplift due to frost heave can actually lift the poles and their anchors completely out of the ground. The pole jacking problem has plagued all of the utility companies throughout vast areas of the arctic and subarctic regions.

The patent application Ser. No. 174,687 of Elmer D. Waters on Permafrost Structural Support With Heat Pipe Stabilization filed August 25, 1971, now Pat. No. 3,788,389, now discloses and claims a cooperative combination of a support structure and heat pipe element installed in generally frozen soil. The heat pipe element is of a suitably complementary configuration and/or disposition with respect to the support structure to provide appropriate stabilization of the surrounding frozen soil. In one embodiment, the heat pipe element is disposed externally of the support structure and, in another embodiment, it is disposed internally of (and integrally combined with) such structure. The external embodiment further includes one version employing a linear (straight) heat pipe element and another version employing an angular (helical) element. In both versions of the external embodiment, an overlapping joint can be provided to join an aboveground radiator section of the heat pipe element to an underground embedded section thereof. This permits the upper radiator section to be readily separated and detached from the lower embedded section at the joint.

The heat pipe element just described above and various other natural convection heat transfer devices used for stabilization of permafrost foundation areas present a problem when complete device replacement is necessary, even if the device is not part of the support structure. Replacement usually requires the digging of a new hole and this may be difficult to accomplish in remote and rugged regions where a drilling rig cannot be easily transported and/or used. In addition, if the particular installation first requires removal of the old device, this may be especially difficult since it is likely to be in frozen ground with the supported structure or associated support structure securely attached to the old device. Of course, essentially the same difficulties are encountered with support structures already installed in areas where stabilization is subsequently found to be necessary.

SUMMARY OF THE INVENTION

Briefly, and in general terms, our invention is preferably accomplished by providing a separable heat pipe assembly for stabilizing the normally frozen soil adjacent and supporting, for example, a structural member or foundation used in arctic, subarctic or similar regions, including a cooperative combination of a heat gathering sheath which is normally installed in the generally frozen soil and a closely mating heat pipe element which is normally inserted into the sheath with a substance of good thermal conductivity generally filling the small void therebetween. The sheath is normally embedded fully underground either adjacent to the structural member or within the foundation bed, and preferably has longitudinal fins which are circumferentially spaced from each other and extend radially from the sheath.

The heat pipe element broadly includes an elongated tubular container having a filling or charge of a suitable working fluid, a wick or condensate spreader element in the container and a heat exchanger (radiator) suitably coupled or integrally incorporated with an upper portion of the tubular container. The lower portion of the tubular container can be inserted into the embedded sheath with the upper portion (and its radiator section) protruding aboveground. The bottom of the tubular container normally rests against the inside bottom of the sheath, leaving a generally annular space between the sides thereof. Heat transfer between the sheath and lower portion of the heat pipe element is facilitated by filling the small annular space with an appropriate thermal substance which is preferably a liquid mixture of water ($H_2O$) and ethylene glycol ($HOCH_2\cdot CH_2OH$), for example.

The average or nominal thickness of the annular space between the sheath and heat pipe element is an important feature of this invention. It must be large enough to permit relatively easy insertion of the lower portion of the heat pipe element into the sheath and similarly easy subsequent withdrawal if desired or necessary. It must, however, be kept as small as is conveniently possible since most substances which could be used to fill the annular space would normally have a thermal conductivity less than that of the sheath and heat pipe element (metallic) materials, and minimizing the thickness of the annular space will tend to minimize the thermal losses and lead to higher performance.

The selection of the substance to fill the annular space between the sheath and heat pipe element is ordinarily based upon the desire to obtain as good a thermal conductivity therebetween as possible consistent with the existing constraints. Ice has relatively good thermal conductivity and, therefore, water can be conveniently used in a variety of applications of the invention. A water and ethylene glycol mixture of various proportions or ratios may be preferably used. A small amount, such as 3%, of ethylene glycol will lower the freezing point a few degrees and may be necessary in certain instances where the use of water only would lead to prompt ice formation in the sheath and, thus, prevent insertion of the closely mated heat pipe element.

Different ratios of the water and ethylene glycol mixture can be chosen. It may be desired or required, for example, to lower the freezing point of the mixture such that it would rarely, if ever, freeze so that the heat pipe element can always be easily removed and replaced. A penalty in thermal performance would be involved since any water and ethylene glycol mixture has a poorer thermal conductivity than ice (water only); however, the penalty may be acceptable in order to obtain other desired characteristics. Of course, a wide variety of different thermal substances such as other liquids, mercury, a paste or, in their absence, even air (with the thin annular space) can be used instead of the water and ethylene glycol mixture.

The exterior shape of the sheath can be designed according to its usage and nature of the surrounding soil or other factors. It can be round, square or irregular, finned or unfinned and, if finned, with any selected number of fins of different arrangement and geometry. The fins on the sheath, or on the radiator section of the upper portion of the heat pipe element, can be laterally or longitudinally arranged and of uniform or varying widths and thicknesses, for example. The interior shape of the sheath can be cylindrical with a hollow circular cross section to mate with a complementary exterior shape of the lower portion of the heat pipe element and is usually most convenient. Of course, the complementary shapes of the sheath and corresponding portion of the heat pipe element can have other cross sectional configurations such as oval, retangular, triangular, etc., which can be constant or diminishing in area with length from top to bottom, for example.

In an analogous or generally similar heat pipe installation in a permafrost environment, a relatively large diameter tubular support structure installed in the permafrost has a plurality of heat pipe elements installed longitudinally in and equiangularly spaced circumferentially about the support structure. Each heat pipe element has its lower portion installed in the support structure and positioned at least in proximity to the wall of the structure, and a suitable thermal substance is used to fill the remaining space in the support structure. The full length of the lower portion of each element preferably contacts the structure wall. This is, however, impractical and impossible to achieve with the lengths and manufacturing tolerances involved.

The plurality of heat pipe elements installed in the tubular support structure longitudinally in proximity to its wall can be seen to be generally similar to the single, closely mating, heat pipe element inserted into the tubular sheath installed in generally frozen soil since the annular space between the latter mating components is increasingly approximated with an increasing number of elements installed in the support sturcture.

The upper portion of each heat pipe element having its lower portion installed in the tubular suppot structure preferably has a thicker wall than the lower portion, to be stronger and allow processing work on the upper portion with little possibility of damaging it. In one version, the upper element portion is threaded and a sleeve-type radiator is complementarily threaded so that it can be threadedly secured thereto. The depth and pitch of the threads can be selected to provide a predetermined heat transfer surface area between the coupled upper element portion and radiator. In another version, the upper element portion and radiator are not threaded but are appropriately sized to provide for an interference press fit therebetween.

A lubricant-preservative-thermal substance provided in the interface space between the mating surfaces of the threadedly engaged or press-fitted upper element portion and radiator can be used to serve primarily as a lubricant during installation and as a preservative-thermal substance later. It is noted that the threaded version has an advantage in that the radiator can be easily removed from the upper element portion whereas the press-fitted version has an advantage in that a more intimate and tighter contact is obtained between coupling surfaces that there can be less dependency upon the need for the thermal substance as a coupling agent.

BRIEF DESCRIPTION OF THE DRAWINGS

Our invention will be more fully understood, and other advantages and features thereof will be come apparent, from the following description of certain exemplary embodiments of the invention. The description is to be taken in conjunction with the accompanying drawings, in which.

DESCRIPTION OF THE PRESENT EMBODIMENTS

In the following description and accompanying drawings of certain illustrative embodiments of our invention, some specific dimensions and types of materials are disclosed. It is to be understood, of course, that such dimensions and types of materials are given as examples only and are not intended to limit the scope of this invention in any manner.

Figure 1:
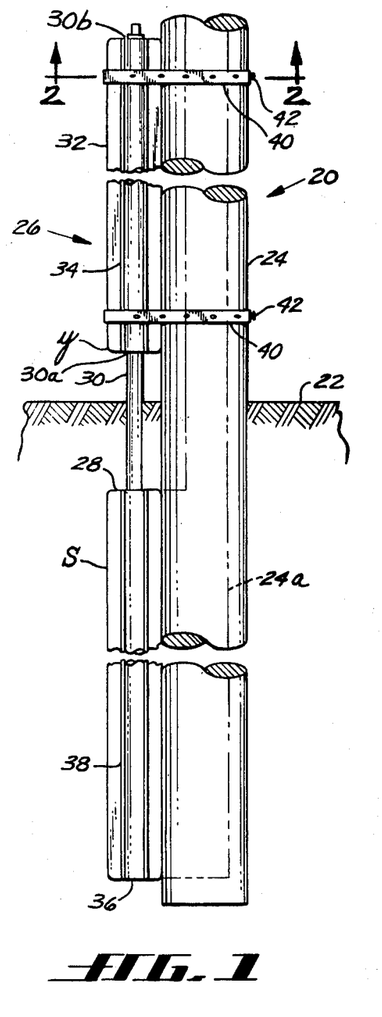
FIG. 1 is a fragmentary elevational view of a structural support assembly installed in generally frozen soil, including a cooperative combination of a support structure and a separable heat pipe assembly according to this invention.

FIG. 1 is a fragmentary elevational view of a structural support assembly 20 installed in generally frozen soil 22. The support assembly 20 broadly includes the cooperative combination of a support structure 24 and a separable heat pipe assembly 26. The support structure 24 is, in this instance, a utility pole; however, it can be any other form of structure such as a building pile or the like. The assembly 26 is essentially a twopiece combination of separable components including sheath S and heat pipe element y. These separable components S and y are individually shown and described later.

The utility pole 24 is regularly installed in soil 22 with the sheath S positioned alongside the pole. The sheath S is preferably positioned parallel to the pole 24 and directly against it as shown in FIG. 1 or as feasibly close as possible. The top 28 of the sheath S can be usually located about, for example, 1 foot below the surface of the soil 22 but it could extend above the surface. In fact, the sheath S can be an integral (hollow) part or modified portion of the support structure as indicated in phantom lines 24a, with the heat pipe element y suitably adapted to be installed therein. The heat pipe element y broadly includes an elongated tubular container 30 having a filling or charge of a suitable working fluid such as ammonia therein, and a heat exchanger 32 suitably coupled to the upper portion of the tubular container. The heat exchanger 32 can be a passive radiator integrally incorporated with the upper portion of the container 30. The radiator 32 is formed, for example, by providing a plurality of longitudinal fins 34 which are integrally affixed to (extruded with) the upper portion of the tubular container 30 and extending radially therefrom.

The sheath S includes a central tubular body 36 for receiving the lower portion of the container 30, and a plurality of longitudinal fins 38 similar to those of the radiator 32. In inserting the lower portion of the tubular container 30 fully into the sheath S, a substance of good thermal conductivity is normally used to fill the void remaining therebetween. After proper mating of the sheath and heat pipe element components S and y, the heat pipe element can be secured in position by fastening its radiator 32 section to the adjacent section of the utility pole 24 and the components covered to the appropriate extent with soil 22. The radiator 32 is preferably given an outside white coating finish to reflect incident radiation, and the sheath S can be suitably coated on the outside to minimize soil to metal corrosion.

Figure 2:
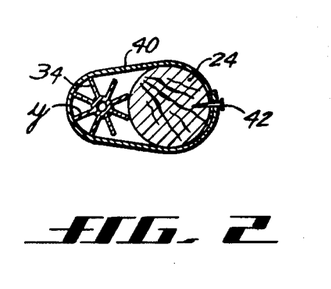
FIG. 2 is a cross sectional view of the structural support assembly as taken alongthe line 2—2 indicated in FIG. 1.

FIG. 2 is a cross sectional view of the structural support assembly 20 as taken along the line 2—2 indicated in FIG. 1. The radiator 32 section of the heat pipe element y is fastened to the utility pole 24 by, for example, relatively flexible sheet metal straps 40. The straps 40 are wrapped around the radiator 32 section and pole 24 near the lower and upper ends of the radiator, with the ends of the wrapped straps secured together and attached to the pole by lag screws 42. There are, of course, various other equally suitable means and methods of fastening the heat pipe element y to the utility pole 24 or other support structure.

Figure 3:
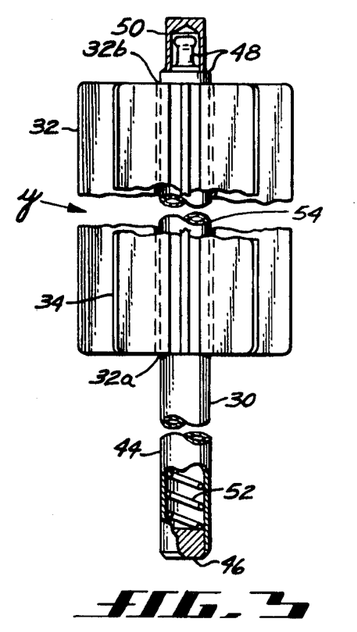
FIG. 3 is a fragmentary elevational view, shown partially broken away in section, of the heat pipe element of the separable heat pipe assembly.

FIG. 3 is a fragmentary elevational view, shown partially broken away in section, of the heat pipe element y. The element y includes a lower tube 44 closed by an end plug 46, an upper radiator 32 with longitudinal fins 34 and an upper pinch-off plug 48 with a cover cap 50. The lower tube 44 preferably contains a wick or condensate spreader element 52 which can be coarse mesh wire screen or convolute element as a helical spring wire of small diameter contacting the internal wall surface of the lower tube. The lower end of the helical wire 52 rests against the end plug 46, and the upper end extends to a point near the top 28 (FIG. 1) of sheat S when properly mated with the heat pipe element y.

The end plug 46 can be welded to the lower end of tube 44, and the upper end of the tube can also be welded in registry to the lower end 32a of the matching central tubular body 54 of the radiator 32 which can be a fully extruded section. Pinch-off plug 48 is preferably welded to the open upper end 32b of the radiator tubular body 54 and, after charging of the heat pipe element y with a suitable working fluid such as ammonia and following pinch-off, the cover cap 50 can be welded to the pinch-off plug to protect its closed stem.

Essentially all of the parts of the heat pipe element y can be made of a suitable aluminum alloy, for example. Illustrative only, the lower tube 44 can have an outside diameter of 1.050 inches and an inside diameter of 0.824 inch, and its length can typically vary from about 98 to 151 inches according to conditions and usage. Similarly, the radiator 32 can vary in length from about 60 to 120 inches with 8 relatively thin fins 34 circumferentially spaced equiangularly around the radiator body 54. The longitudinal fins 34 have a diametrical spread between outer edges of, for example, 5 inches. Finally, the helical spring element 52 can be fabricated from 0.060 inch diameter wire in a helix having a nominal outside diameter of 1.100 inches and a nominal pitch of 0.50 inch. Of course, the element 52 can be omitted where the inside diameter of the lower tube 44 is small (less than, for example, approximately 0.25 inch).

Figure 4:
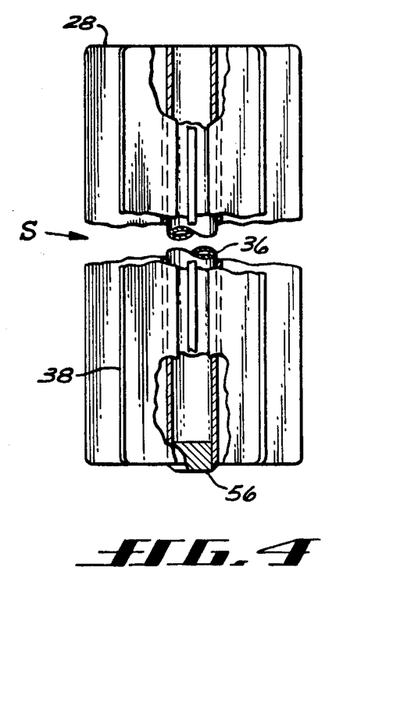
FIG. 4 is a fragmentary elevational view, shown partially broken away in section, of the sheath of the separable heat pipe assembly.

FIG. 4 is a fragmentary elevational view, shown partially broken away in section, of the sheath S. Sheath S can be substantially identical to the extruded radiator 32 section of the heat pipe element y except that the central tubular body 36 of the sheath has a slightly larger inside diameter to accommodate the lower tube 44 (FIG. 3) of the heat pipe element and, additionally has an end plug 56 welded to close the lower end of the sheath. The sheath body 36 has an inside diameter of, for example, 1.080 inches which provides with the mated lower tube 44 a generally annular space or void of 0.015 inch thickness between the side walls thereof. The length of the sheath S can typically vary from about 80 to 120 inches according to conditions and usage.

The sheath S of FIG. 4 with the end plug 56 deleted (or the sheath can be inverted) can also represent the radiator 32 (FIG. 1) installed on the upper portion of heat pipe element y which, in this instance, can be a completely tubular container 30. A layer of thermal paste (such as Dow Corning DC-340) can, for example, be suitably applied to the upper portion of the tubular container 30 and the inner walls of the tubular body 36 of sheath S before it is installed and suitably secured on the upper portion of the tubular container. Alternately, a thermal liquid can be used to fill the space between the upper portion of tubular container 30 and the installed tubular body 36 of sheath S by first providing a lower seal 30a (FIG. 1) between the lower periphery of the tubular body and corresponding part of the tubular container. An upper seal 30b can be similarly provided after filling. The lower and upper seals 30a and 30b can be for example, suitable plastic insert rings or even welds.

Figure 5:
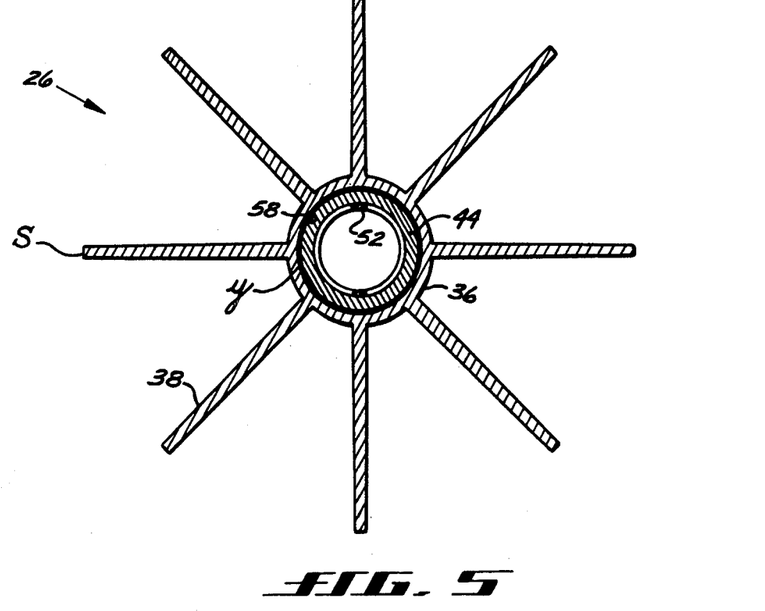
FIG. 5 is a cross sectional view of the separable heat pipe assembly as taken along a line through the lower portion thereof, with the heat pipe element installed in its sheath.

FIG. 5 is a cross sectional view of the separable heat pipe assembly 26 as taken along a line through the lower, mated sheath and heat pipe element components S and y, portion thereof. The sheath body 36 has a wall thickness of 0.094 inch and the longitudinal fins 38, which taper in thickness radially outwards from 0.110 to 0.080 inch, have a diametrical spread between outer edges of 5 inches, for example. The generally annular space 58 between the central tubular body 36 of sheath S and the lower tube 44 of the heat pipe element y is normally filled with a substance of good thermal conductivity. The thermal substance is preferably a liquid mixture of water and 3% ethylene glycol, for example. Different ratios of the water and ethylene glycol mixture, and various other thermal substances such as a paste or grease as discussed earlier can, of course, be used. A predetermined amount of liquid can be poured into the tubular body 36 of sheath S before the lower tube 44 of heat pipe element y is fully inserted therein.

The generally anular space 58 is of the order of 0.015 inch thickness for the sheath and heat pipe element components S and y having exemplary mating diameters of approximately 1 inch and lengths from about 80 to 120 inches. This thickness of 0.015 inch for the annular space 58 can remain about the same order even with mating diameters considerably different from approximately 1 inch since the annular space must be kept as small as conveniently possible to minimize thermal losses, and manufacturing tolerances cannot normally be made much closer to permit practical fabrication with relatively easy insertion of the lower tube 44 into (and any subsequent removal out of) the central tubular body 36 of sheath S. Thus, considering the various factors involved, a minimal thickness annular space 58 requiring little, if any, filler thermal substance is preferably provided and used in the separable heat pipe assembly 26.

Generally, while various conditions and factors must be considered, use of the separable heat pipe assembly 26 (FIG. 1) in permafrost areas typically requires a radiator 32 surface area optimumly of about 3 or 4 square feet per foot of sheath S length fully embedded in soil 22 to dissipate properly (and to a large extent by convection) the usual heat picked up by the sheath. Such radiator surface area is found to be quite sufficient with the air temperatures encountered in the permafrost areas. Of course, on those occasions when the air temperature is unusually high, heat cannot be transferred from the air into the soil 22 by the assembly 26 because of its arrangement and the well known heat pipe mode of operation wherein gravity continually drains any condensate away from the radiator 32. The radiator 32 section can be conveniently and preferably varied in (extrusion) length to achieve any desired or necessary surface area.

Similarly, it is generally desirable to place a sheath S having the largest, relatively thin, surface area in the ground. The most economical and practical configuration for use in permafrost areas has been found to be the finned sheath S. Of course, various other sheath configurations can and have been used in different applications and/or soil conditions. More sheath S surface area is generally needed in wet soil 22 than in dry since more heat must be picked up by the heat gathering fins 38 to stabilize the surrounding soil. In the typical permafrost areas, lateral surface area provided by the fins 38 is quite adequate for virtually all normal soil 22 conditions and it is the sheath S length which is of more importance. The tubular container 30 (FIG. 3) of the heat pipe element y is preferably about as long as the underground portion of its associated support structure 24 (FIG. 1) and the sheath S should be approximately of the same length except for the relatively small layer of soil 22 above the top 28 of the sheath, to ensure stabilization of surrounding soil area which fully encompasses the underground portion of the support structure within a suitable margin.

Some commonly used lengths of the separable heat pipe assembly 26 with a nominally 1 inch diameter heat pipe are illustratively shown below. It may be noted that in certain of these examples, adequate but not optimum radiator 32 surface area is utilized because of their intended usage. All of the listed dimensions are given in inches.

| Overall Length | Radiator Length | Sheath Length |
| --- | --- | --- |
| 162 | 60 | 84 |
| 174 | 72 | 84 |
| 180 | 80 | 80 |
| 222 | 96 | 108 |
| 240 | 102 | 120 |
| 270 | 120 | 120 |

Figure 6:
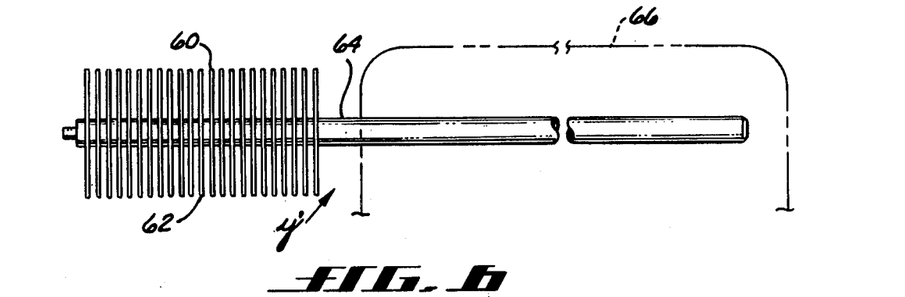
FIG. 6 is a fragmentary elevational view of another version of a heat pipe element of a separable heat pipe assembly.

FIG. 6 is a fragmentary elevational view of another version y' of a heat pipe element for another separable heat pipe assembly. The heat pipe element y' is used in applications where it is desirable to have the above-ground radiator 60 in a nearly horizontal position, such as under a building where the clearance space is too limited to accommodate a generally vertical radiator. The fins 62 of the radiator 60 are preferably disposed laterally with respect to the tubular container 64 of the heat pipe element y' as illustrated. The horizontal radiator 60 can provide much more surface area per unit length and, thus, the heat pipe element y' is generally suited for much greater in-ground lengths than the heat pipe element y (FIGS. 1 and 3).

It is noted that the heat pipe element y' of FIG. 6 can, in certain instances, be directly inserted almost horizontally into either the soil or a pocket provided in a foundation bed 66, indicated in phantom lines, where removal and replacement may be more easily accomplished than with a deep vertical hole. It is also possible to bend the tubular container 64 near or at some distance from the radiator 60 so that a corresponding portion of the tubular container can be oriented at a selected angle from horizontal. Of course, the tubular container 30 (FIG. 1) can be similarly bent at a point above the top 28 of its mated sheath S to orient the tubular container and the radiator 32 at any selected angle with respect to each other.

Figure 7:
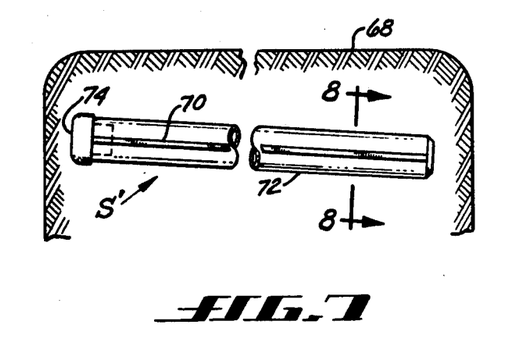
FIG. 7 is a fragmentary elevational view of another version of a sheath, installed in a foundation bed, for the heat pipe element of FIG. 6.

FIG. 7 is a fragmentary elevational view of another version S' of a sheath for another separable heat pipe assembly. The sheath S' is shown installed in a foundation bed 68 which can be used to support various structures (not shown). The sheath S' is similar to the sheath S (FIG. 4) except that only two generally horizontally disposed longitudinal fins 70 extending radially from the central tubular body 72 of the sheath are needed or required with the relatively low foundation bed 68. The sheath S' is shown illustratively inclined at a selected angle from horizontal, so that its mating heat pipe element y' will be similarly inclined. A minimal slope of from 0.25 to 0.50 inch per foot is preferably provided, for example, for the sheath and heat pipe element components S' and y' used in the typical foundation bed 68.

It can be seen from the cross sectional view of the foundation bed 68 that its height is not great; however, its length could be quite extended as where it is the foundation bed for a railroad track or the like. In this instance, the foundation bed 68 can be constructed in regular manner coupled with the installation of spaced sheaths S' which are each sealed with a cap plug 74. Thus, construction of the foundation bed 68 can proceed without obstruction by having heat pipe elements y' protruding therefrom during such time. The sheath S' (and sheath S of FIG. 4) can be suitably closed with a commercially available Caplug, type WW13, to keep dirt and moisture out of the sheath. When desired or necessary, the cap plug 74 can be removed from a sheath S' and a mating heat pipe element y' installed therein.

Figure 8:
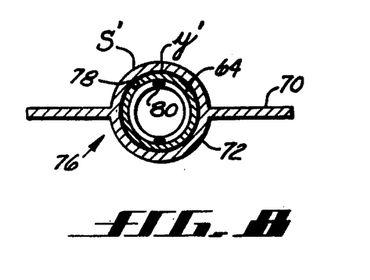
FIG. 8 is a cross sectional view of the sheath, with its heat pipe element installed therein, as taken along the line 8—8 indicated in FIG. 7.

FIG. 8 is a cross sectional view of the sheath S' with the heat pipe element y' of FIG. 6 installed therein following exposure and removal of the cap plug 74, as taken along the line 8—8 indicated in FIG. 7. This separable heat pipe assembly 76 is broadly similar to the separable heat pipe assembly 26 of FIG. 1. The assembly 76 has a generally annular space 78 of minimal thickness between the body 72 and container 64 of the mated sheath and heat pipe element components S' and y'. As in the heat pipe element y (FIG. 3), the heat pipe element y' preferably includes a wick or condensate spreader element 80 which can be in the form of a helical spring, for example.

It may be noted that while the thin space 78 is not strictly annular over the full length of the mating portions, since the end of the heat pipe element y' will tend to rest against a corresponding point in the sheath S' to support part of the weight of the heat pipe element, a thermal substance filling the thin space would help buoy up the heat pipe element end if the substance is a liquid and would actually support it when the substance is frozen or is a solid material. Of course, it is not critical or essential that the thin space 78 be closely or nearly annular throughout the entire length of the mated portions of the sheath and heat pipe element components S' and y', or that the thin space be completely filled with the thermal substance.

In another embodiment of the separable heat pipe assembly, a helical version of the sheath S' of FIGS. 7 and 8 can be used. The sheath S' is, in this instance, helically wrapped around the underground portion of a support structure such as the utility pole 24 shown in FIG. 1. Of course, the plane of the fins 70 is preferably wrapped helically concentric and parallel to the surface of the pole 24. The mating portion of the tubular container 64 (FIGS. 6 and 8) of the heat pipe element y' is helically formed correspondingly to the helically wrapped sheath. A larger clearance space is ordinarily provided between the helically formed tubular container and sheath to facilitate installation, and the space is preferably filled with a liquid thermal substance. The formed tubular container is also preferably fabricated of a suitably flexible, pliable and tractable material so that it can be more easily installed into the formed sheath. Further, the radiator 60 can be of the sheath form and the tubular container 64 wholly of the tube form for greater installation handling ease. It is apparent that FIG. 8 also illustrates a cross sectional view through the mating sheath and heat pipe element portions of the helical embodiment of our invention.

Figures 9, 10, 11, 12:
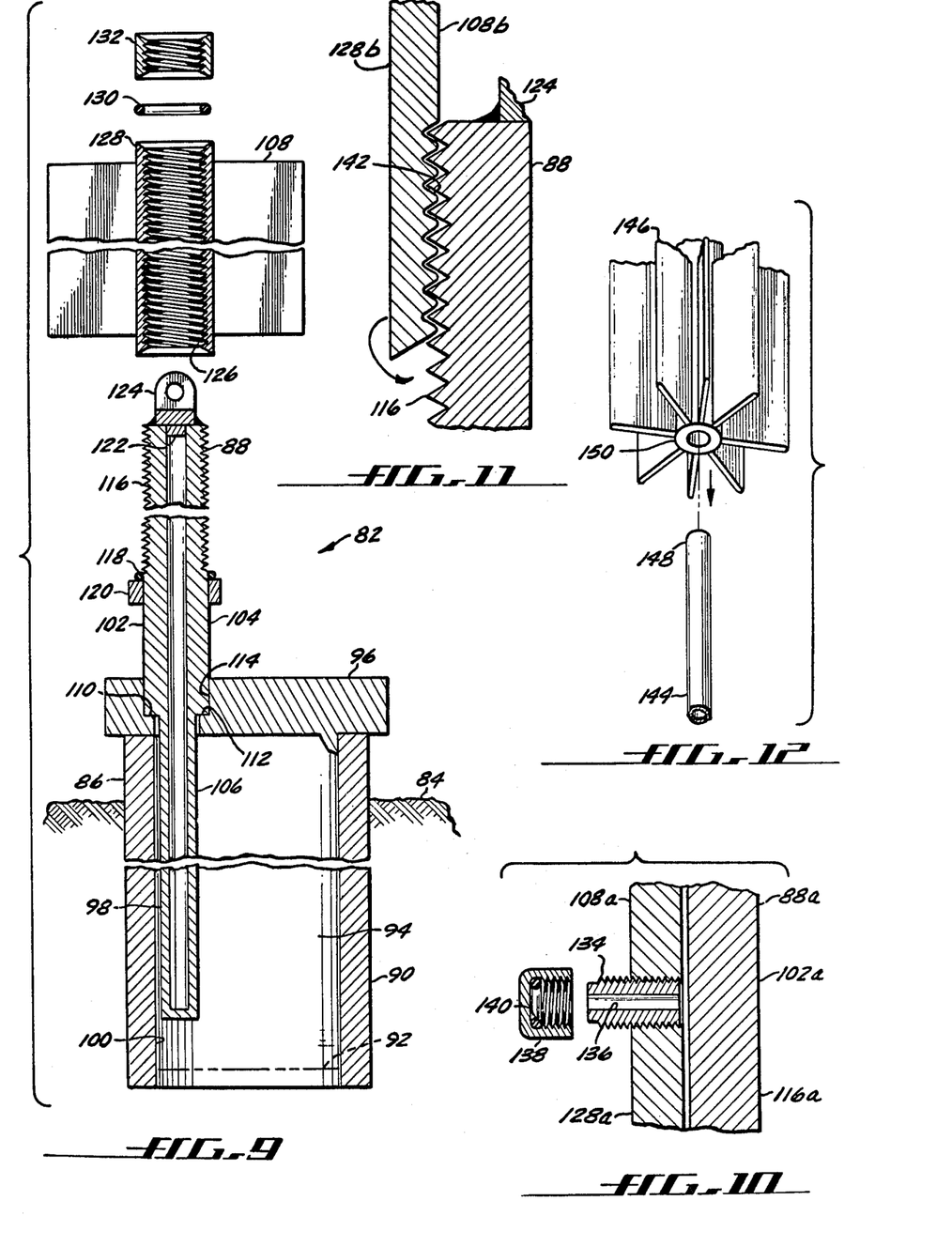
FIG. 9 is a fragmentary elevational view generally similar to that shown in FIG. 1, of another structural support assembly installed in a permafrost environment.
FIG. 10 is a fragmentary elevational view, sectionally shown, of adjacent portions of a heat pipe element and coupled sleeve-type radiator, the radiator portion including a fitting for injecting a thermal substance into the space between the coupled parts.
FIG. 11 is a fragmentary elevational view, in section, illustrating the installation of an unthreaded radiator on a threaded portion of a heat pipe element.
FIG. 12 is a fragmentary elevational view of a perspectively shown heat pipe element and sleeve-type radiator which are sized to provide for an interference press fit of the radiator on an upper portion of the element.

FIG. 9 is a fragmentary elevational view somewhat similar to that shown in FIG. 1 of a structural support assembly 82 installed in generally frozen soil 84. The support assembly 82 includes a cooperative combination of a support structure 86 and heat pipe element 88. The structure 86 and element 88 are sectionally shown with the latter further shown largely exploded. All of the parts and structue shown sectionally can be of symmetrical cylindrical configuration. The structure 86 can be, for example, a hollow pile 90 which can be open at its lower end or sealed closed with a bottom plate 92. The accommodation space or chamber 94 of pile 90 with open lower end can be filled with a mixture of soil and water (the amount of water preferably used being such that the soil does not become saturated), and with closed lower end can be filled wit liquid such as a suitable mixture of water and ethylene glycol or with the soil-water mixture. The upper end of the pile 90 can be closed with a cover plate 96 which is designed to provide lateral support to the heat pipe element 88. A clamping bracket or other means of lateral support can be substituted for the cover plate 96.

The heat pipe element 88 is inserted into the support structure 86 so that the lower portion 98 of the element extends nearly to the lower end of the pile 90. The pile 90 is typically 34 feet long, for example. The element 88 is positioned adjacent and/or against the inner surface 100 of the pile 90 such that the lower portion 98 is disposed at least adjacent and generally parallel to the pile's inner surface. Obviously, over the illustrative pile length of about 34 feet, certain lengths of the element's lower portion 98 may contact the pile's inner surface 100 and other lengths may not because of curvatures and distortions permitted within ordinary manufacturing tolerances. It is preferable that the entire lower portion 98 of the element 88 contact the inner surface 100 of the pile 90. Since this is essentially impossible to achieve under normal conditions, a small gap or void therebetween is acceptable and not detrimental to satisfactory performance. With a standard pile 90 having a typical outside diameter of 18 inches, for example, any stand-off of the lower portion 98 should not exceed 2 inches from the inner surface 100. At such stand-off distances, the lower portion 98 can be considered to be proximate to the inner surface 100 for the typical size piles.

The positioning of the heat pipe element 88 at least closely adjacent to the inner surface 100 of pile 90 is similar to the close mating of heat pipe element y (FIGS. 1 and 5) in the sheath S. Although not very obvious, this will become more readily apparent when it is understood that more than one element 88 would be usually positioned circumferentially and equiangularly in the relatively large diameter pile 90. Thus, with an increasing number of elements 88 installed in the pile 90, the generally annular space 58 (FIG. 5) will be increasingly approximated. While the components in FIG. 9 are accurately depicted in most respects, they are not entirely to scale proportionately for clarity of illustration. The element 88 includes an upper portion 102 which has a thicker wall 104 than the wall 106 of the lower portion 98. The thinner wall 106 is more effective in transmitting heat; however, the thicker wall 104 is provided in part to accommodate and support a radiator 108. The thicker wall 104 is stronger and allows safer processing (thread-cutting, press-fitting, etc.) work thereon. The radiator 108 is shown as a sleeve-type (open at both ends) radiator although it can be a sheath-type (open at one end) radiator.

The lower portion 98 of the heat pipe element 88 can be suitably welded to the upper portion 102 thereof. The shoulder 110 beside the weld junction can be engaged by the ledge 112 produced by counterbore 114 in the plate 96. The counterbore 114 is suitably positioned in the plate 96 that the lower portion 98 of the element 88 can be positioned as close as possible to the inner surface 100 of the pile 90 and still allow full insertion of the element's lower portion into the pile without any damage. In this instance, certain lengths or points along the element's lower portion 98 will, of course, depart from its ideally straight condition which is illustrated in FIG. 9 and, in actuality, contact the pile's inner surface 100.

In one embodiment of the heat pipe element 88, a threaded section 116 is provided on the element's upper portion 102. An elastomer (O-ring) seal 118 and its retaining ring 120 can be located at the lower end of the threaded section 116, and a closure plug 122 with lifting lug 124 are located at the upper end of the threaded section. The retaining ring 120 and closure plug 122 can be suitably welded to the upper portion 102 of the element 88. A screw thread is conventionally produced on the section 116 by a die, for example. Depth and pitch of the thread on section 116 are selected to provide a predetermined increase in heat transfer surface (area) and to secure the radiator 108 firmly to the element 88. A limiting factor on the depth of the screw thread would be the thickness of the wall 104 of the element's upper portion 102. Consequently, for a given thickness of the wall 104 and maximum permissible thread depth, the pitch of the thread on section 116 can be appropriately varied to obtain the desired or necessary increase in heat transfer surface.

A screw thread corresponding to that on section 116 of the heat pipe element 88 is, of course, provided on the inner wall 126 of tubular body 128 of the sleeve-type radiator 108. A lubricant-preservative-thermal substance is carefully applied to the screw threads on section 116 of the element 88 and wall 126 of the radiator 108. This substance can be, for example, a zinc oxide-filled silicone base thermal grease or other similar grease or wax or oil, etc. The radiator 108 is then screwed on the element 88 until lower seal 118 is properly compressed. Another elastomer (O-ring) seal 130 is placed on the threaded section 116 at the top of the tubular body 128 and the threaded retaining ring 132 is screwed onto the upper end of the threaded section. The ring 132 is screwed on the element 88 until upper seal 130 is properly compressed. The ends of the body 128 and ring 132 can be slightly countersunk to conform somewhat with the contour of the seals 118 and 130. The length of the threaded section 116 is sufficiently long so that the lifting lug 124 will fully protrude at least above the top edge of the fastened retaining ring 132.

The seals 118 and 130 serve to retain the grease in between the threads on heat pipe element 88 and radiator 108, and to keep moisture out. In this latter connection, it may be noted that the element 88 is preferably made of steel and the radiator 108 of aluminum, and resistance to electrolytic corrosion is provided both by use of the lubricant-preservative-thermal substance (grease) and suitable seals to prevent entry of moisture. Of course, the grease will tend to be held in place by the (meshed) threads of the element 88 and radiator 108. The use of threads on the element 88 and radiator 108 also has the benefit of providing fairly precise sizing of the respective parts as well as allowing the radiator to be fully secured throughout its length to the element. The heat transfer surface area is increased as mentioned previously and can be easily changed by varying the pitch and depth of the thread to be provided on the element 88 and the radiator 108. While ordinary screw threads are preferably used for greatest overall expediency, other forms are suitable and may be used instead to provide advantages not available with the ordinary threads.

In another embodiment of the heat pipe element 88, the section 116 of the upper portion 102 is not threaded. Similarly, the inner wall 126 of the tubular body 128 of the sleeve-type radiator 108 would be correspondingly unthreaded and can be closely mated to the unthreaded section 116 of the element 88. The upper retaining ring 132 is also unthreaded and can be, for example, press-fitted on the end of the unthreaded section 116. Of course, a suitable thermal grease or paste is provided in the small gap or void between the mating surfaces of the element 88 and radiator 108. In the absence of threads on the element's section 116 and radiator's wall 126, or where loosely meshing threads are used, some leakage and loss of the thermal grease or paste can occur over an extended period. To assure and facilitate adequate initial filling and later replenishment of the thermal grease or paste, means for injecting such substance into the space between the mating surfaces of the element 88 and radiator 108 can be used.

FIG. 10 is a fragmentary elevational view, sectionally shown, of an unthreaded section 116a of the upper portion 102a of heat pipe element 88a and the correspondingly unthreaded body 128a of a sleeve-type radiator 108a. A fitting 134 which penetrates the unthreaded radiator body 128a is preferably located somewhere near a point longitudinally midway between the two ends of the radiator body. The fitting 134 is threadedly attached to the body 128a and, in its simplest form, merely provides a small passageway 136 communicating with the small gap or void between the section 116a and body 128a. A cap 138 including a seal 140 therein can be used to close the passageway 136. The fitting 134 can be any one of several conventional types and its selection would depend, iin part, on the pressure needed to fill all voids between the element section 116a and radiator body 128a with a thermal grease or paste over the entire length of the radiator body. Thus, for example, the fitting 134 may include a check valve (not shown) therein.

Injection of the thermal substance or additional amounts thereof may be made during initial installation of the radiator 108a on the element 88a and at any future time if the original thermal substance has leaked out or otherwise lost its effectiveness. Of course, more than one fitting 134 can be utilized when necessary, and such fittings would be appropriately spaced circumferentially and longitudinally on the radiator body 128a to assure and facilitate full and effective coverage of all voids therein by the injected thermal substance. It is, however, desirable to reduce the dependency of effective thermal coupling between the element 88a and radiator 108a to the least amount of thermal substance that must be present. In this connection, it is apparent that less care and maintenance of the thermal substance are required in the threaded embodiment of FIG. 9 because of the greater heat transfer surface area available between the threaded element section 116 and threaded radiator body 128.

FIG. 11 is a fragmentary elevational view, in section, illustrating the installation of an unthreaded body 128b of a sleeve-type radiator 108b on the threaded section 116 of the heat pipe element 88. The element 88 is of steel and the radiator 108b is of (softer) aluminum, for example. A lubricant-preservative-thermal substance is applied to the threads on the section 116 and the inner wall of the unthreaded body 128b to reduce friction and prevent galling as the radiator 108b is screwed onto the threaded section of the element 88. The substance functions primarily as a lubricant at this time and rounded threads 142, rather than threads cut to some depth, are formed on the inner wall of the body 128b to engage the threads of section 116 firmly. A more intimate contact and tighter engagement of threads are achieved, and effective heat transfer between the element 88 and radiator 108b becomes less dependent upon the thermal substance as a coupler therebetween. The rounded threads 142 are, however, sometimes difficult to form well and, consequently, this led to an interference press fit approach.

FIG. 12 is a fragmentary elevational view of a perspectively shown heat pipe element 144 and sleeve-type radiator 146 which are to be mated together. The exterior of the upper portion 148 of the element 144 and the corresponding interior of the tubular body 150 of the radiator 146 are not threaded, but are diametrically sized to provide for an interference press fit. A lubricant-preservative-thermal substance can be coated on the exterior of the element's upper portion 148 and on the interior of the radiator's body 150 to act as a lubricant for the pressing operation and subsequently as a heat transfer medium and preservative.

The element 144 can be made of steel and its upper portion 148 can have an outer diameter of 3.000 to 3.009 inches, and the radiator 146 can be made of aluminum and its body 150 can have an inner diameter of 2.980 ± 0.020 inches, for example. A high interface conductance is obtained with a properly produced interference press fit. This provides a suitably tight fit and the lower seal corresponding to the seal 118 (and its retaining ring 120) in FIG. 9 could be omitted if desired; however, an upper seal corresponding to the seal 130 and a press-fitted retaining ring are preferably used to prevent water from standing on the upper edge of the interface between the element's upper portion 148 and the radiator's body 150, and then eventually seeping down into such interface.

While this interference press fit results in a nearly permanent assembly of heat pipe and radiator, the heat transfer contact between these components is sufficiently good and solid that little concern need to be given later towards maintaining adequate heat transfer substance in any interface space. In spite of the nearly permanent assembly, the use of a radiator which was separate from its associated heat pipe element is desirable for ease of manufacture, ease of shipment and utilization of different materials.

In manufacture, a separate finned radiator sheath or sleeve can be manufactured either at different times or simultaneously with the heat pipe element (at different locations) and be added later thereto. In shipment, a finned radiator sheath or sleeve which is separate from its heat pipe element permits both to be handled and crated independently, and shipped from the same or different points of origin. Finally, in materials, when the finned radiator sheath or sleeve and its heat pipe element are separate components, this would allow the radiator component to be made of an extruded lightweight material (aluminum) and the heat pipe component to be differently made of a machined stronger material (steel), for example.

While certain exemplary embodiments of this invention have been described above and shown in the accompanying drawings, it is to be understood that such embodiments are merely illustrative of, and not restrictive on, the broad invention and that we do not desire to be limited in our invention to the specific constructions or arrangements shown and described, for various obvious modifications may occur to persons having ordinary skill in the art.

We claim:

1. A heat pipe assembly for installation in a permafrost or similar environment comprising:
   a heat pipe element including a tubular container having a charge of working fluid therein, said container comprising a normally lower portion of a first predetermined wall thickness, and a normally upper portion of a second predetermined wall thickness which is at least approximately equal to said first wall thickness, said lower container portion wall being sufficiently thin to be effective in transmitting heat, and said upper container portion wall being sufficiently strong and thick to allow safe processing work thereon; and
   a heat exchanger including a radiator comprising a tubular body, and heat transferring fins affixed thereto, said upper container portion of said second wall thickness having threads provided on a predetermined part thereof, and said tubular radiator body having threads complementary to said container threads provided thereon, said radiator being attached to said predetermined part of said upper container portion by engaging said radiator threads with said container threads.

2. The invention as defined in claim 1 wherein said container and radiator threads are selected to be of a depth and pitch whereby a predetermined heat transfer interface surface area is obtained between said engaged container and radiator threads.

3. The invention as defined in claim 2 further comprising a sustance of predetermined thermal conductivity generally filling any remaining space between said engaged container and radiator threads, said substance including a lubricant-preservative-thermal grease.

4. The invention as defined in claim 2 wherein said second wall thickness is greater than said first wall thickness, said lower container portion wall being thinner to be more effective in transmitting heat, and said upper container portion wall being thicker to be more strong and allow safer processing work thereon.

5. The invention as defined in claim 3 further comprising at least a normally upper seal means provided at the normally upper end of said tubular radiator body to prevent entry of moisture into any space between said engaged container and radiator threads.

* * * * *